Figure 1:
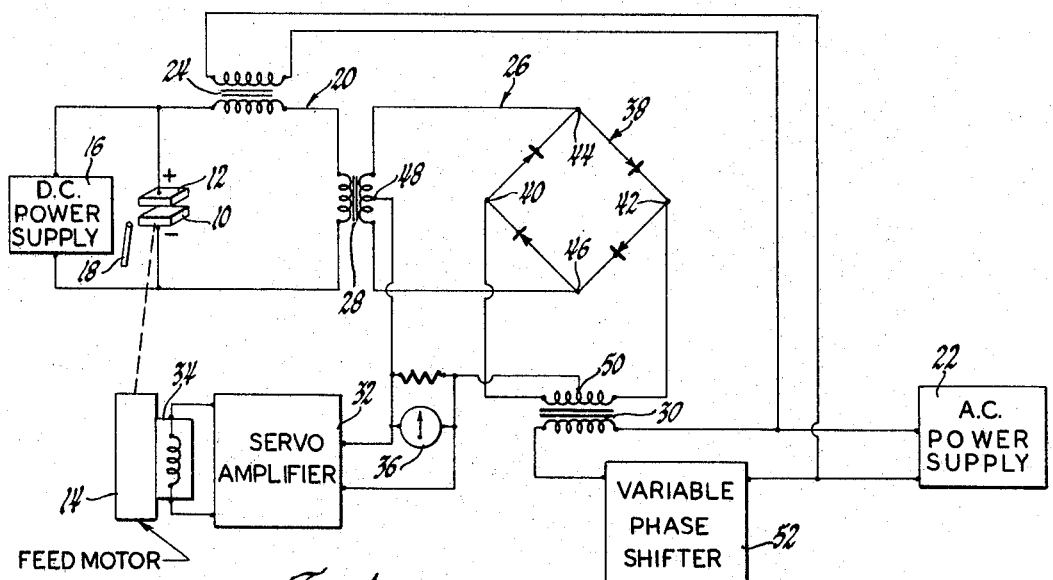

July 25, 1967

M. WOODS 3,332,864

METHOD AND APPARATUS FOR ELECTROCHEMICAL MACHINING INCLUDING
SERVO MEANS SENSITIVE TO A PHASE SHIFT IN AN
LC CIRCUIT FOR CONTROLLING THE MACHINING

Filed Dec. 3, 1962

INVENTOR.
Martin Woods

BY
Hugh L. Fisher
ATTORNEY

United States Patent Office 3,332,864
Patented July 25, 1967

3,332,864
METHOD AND APPARATUS FOR ELECTROCHEMICAL MACHINING INCLUDING SERVO MEANS SENSITIVE TO A PHASE SHIFT IN AN LC CIRCUIT FOR CONTROLLING THE MACHINING
Martin Woods, Warren, Mich., assignor to General Motors Corporation, Detroit, Mich., a corporation of Delaware
Filed Dec. 3, 1962, Ser. No. 241,955
7 Claims. (Cl. 204—143)

This invention relates generally to method and apparatus for electrical stock removal and particularly to method and apparatus for controlling gap spacing.

In any electrical stock removal process, e.g., that commonly known as electrochemical machining, it is essential that proper gap spacing be maintained between the cutting tool and the workpiece electrodes; otherwise, if the gap is too small, damage to the workpiece electrode can occur due to short circuits. Also, when the gap spacing is either too small or too large, stock removal either ceases or at least is substantially reduced. Therefore, a satisfactory way of sensing the gap spacing and making appropriate corrections is necessary.

The nature of the electrochemical machining process further complicates the problem because gap voltage can not be used to accurately reflect gap spacing. Only an average gap voltage is measured and this is not adequate for, as is well known, with an electrolyte present in the gap, current density will be greatest at the closest point between the electrodes. But increases in current density, even of the extent that produce short circuits, can go undetected because they do not alter the average gap voltage. As a result, both the cutting tool and the workpiece can be damaged during the process without the operator ever being warned.

Accordingly, it is proposed by the invention to afford new and different method and apparatus for electrical stock removal that accurately controls the gap spacing between the cutting tool and workpiece electrodes by in effect utilizing variations in gap impedance for control purposes.

More specifically, a unique method and system of controlling gap spacing is proposed whereby gap spacing is accurately sensed in a new and unusual way. Any variations in the gap spacing from the desired gap spacing is detected and appropriate corrections are made.

It is further proposed to provide a gap spacing control system in which gap fluctuations of a certain characteristic representing some desired gap space are produced across the gap; thereafter, the variations in this characteristic are sensed and then measured so as to develop a control signal for making the appropriate corrections in the gap spacing.

Figure 2:
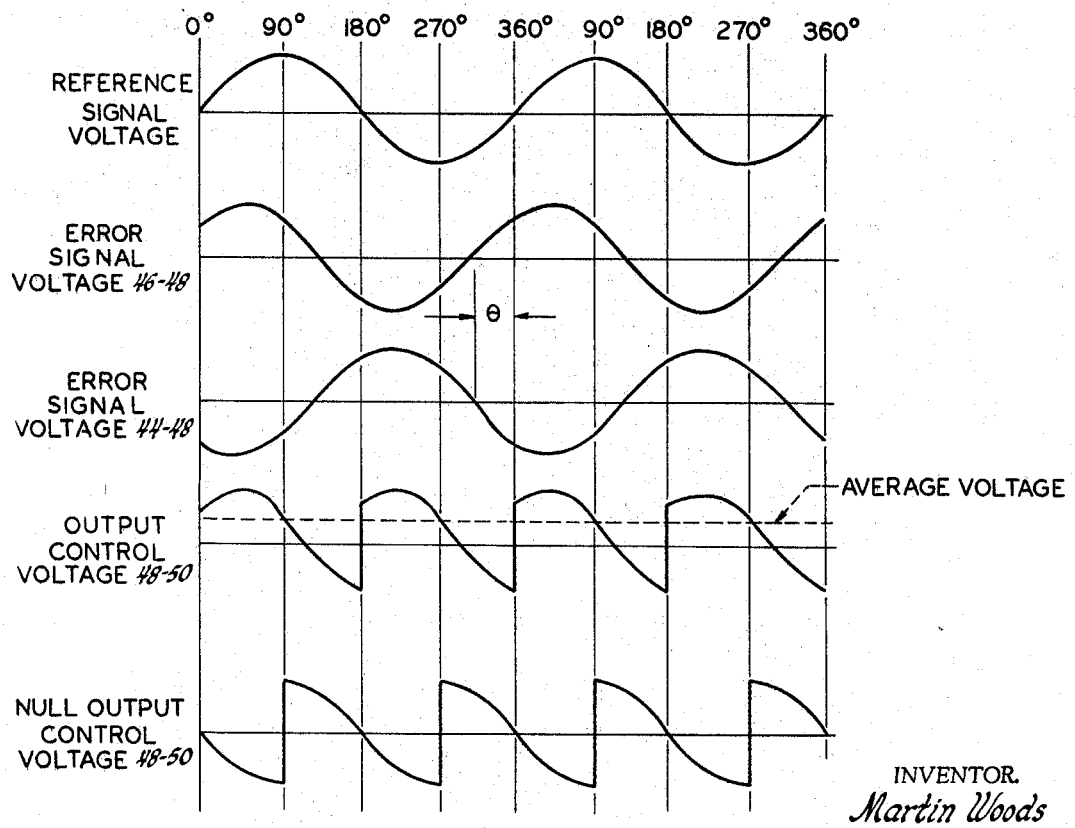

The foregoing and other objects and advantages of the invention will become apparent from the following description and from the accompanying drawings in which:

FIGURE 1 is a circuit diagram of a gap spacing control system for electrical stock removal apparatus incorporating the principles of the invention; and FIGURE 2 illustrates wave forms developed in the FIGURE 1 system.

Referring now to FIGURE 1, the numerals 10 and 12 denote a pair of electrodes, which hereinafter will be referred to respectively as the cutting tool and the workpiece. The cutting tool 10 and the workpiece 12 are maneuvered relative to each other by a feed motor 14 that may be operated electrically, by fluid pressure, or in any other known way. The feed motor 14 moves the cutting tool 10, but if preferred, the feed motor 14 can be connected to the workpiece 12 or both the cutting tool 10 and the workpiece 12 can be maneuvered. A D.C. power supply 16 is connected across the gap formed between the cutting tool 10 and the workpiece 12 so that the workpiece 12 serves as the anode and the cutting tool 10 as the cathode. The power supply 16 delivers a high D.C. power at a low voltage to the gap. For instance, the voltage may be from zero to 24 volts, whereas the current can vary from zero to ten thousand amperes. A suitable electrolyte from a nozzle 18 is flowed through the gap and in effect a deplating takes place during the process with stock being removed from the workpiece 12 in accordance with the contour of the cutting tool 10. If the cutting tool 10 is fed at a proper rate relative to the workpiece 12 by the feed motor 14 and gap conditions do not change appreciably, there will be substantially no variations or disturbances in the current flow between the tool 10 and the workpiece 12. Of course, if the feed rate is not correct for the gap conditions, either the gap will become too large and stock removal slow, or even stop, or the gap can become too small such that short circuits occur. These short circuits also can cause stock removal to stop and additionally can, as explained, produce damage to the workpiece 12 as well as to the cutting tool 10 because of the increased current density at the point of the short circuit.

The FIGURE 1 system provides for accurately sensing the gap spacing. The system comprises a control circuit of the LC series type denoted generally at 20 having the input thereto coupled to an A.C. power supply 22 as by an input transformer 24 and the output thereof coupled to a demodulator or a phase detector designated generally at 26 by an output transformer 28. Since the cutting tool 10 and the workpiece 12 have a capacitance proportional to $A/d$ where A is the area of the cutting tool and the workpiece surfaces, and $d$ is the gap therebetween, the capacitance corresponding to the desired gap spacing is always known. Further, since the A.C. power produces gap fluctuations of a predetermined frequency, the inductive reactance of the control circuit 20 can be accurately controlled, keeping in mind that the inductive reactance includes all of the inductance in the control circuit 20. Therefore, as will become apparent, merely by presetting the gap spacing and by adjusting the appropriate parameters of the input transformer 24 and the A.C. power supply 22, which respectively constitute the capacitive and inductive reactances for the LC series type circuit; any subsequent variations in the gap spacing will produce an impedance change in the control circuit 20, which the output transformer 28 will sense as a phase shift.

This phase shift is compared in the phase detector 26 with the phase of the A.C. power from the power supply 22 by a reference transformer 30. Hence, the phase of the A.C. power serves as a reference and will be proportional to the phase of the gap fluctuations at the time when the desired gap spacing is established. If there is a change in the gap spacing, there will be a corresponding change in the phase angle of the gap fluctuations. It is this changed phase relationship which is sensed by the output transformer 28. As a result, the phase detector 26 will generate a representative output control signal, which may be supplied to a suitable servo amplifier 32, if needed, and then to a controller, such as force motor 34 of known construction. The feed motor 14 will respond and maneuver the cutting tool 10 relative to the workpiece 12 until the desired gap spacing is re-established.

The phase detector 26 is of the character that rectifies a voltage in synchronism with a reference voltage. In the FIGURE 1 embodiment, any error signal as it will hereinafter be designated, produced by the output transformer 28 in the control circuit 20 will be synchronously rectified by a reference signal furnished by the reference transformer 30. If the error signal is 90° out of phase with the reference signal, the phase detector 26 will develop, as will be explained, an output having a zero average D.C. level and a suitable meter 36 will show this null condition. At this null condition the servo amplifier 32 will develop an output that causes the feed motor 14 to maintain the existing gap spacing.

The synchronous rectification can be done in any known way, e.g., by a chopper relay or as illustrated by a bridge circuit 38. The bridge circuit 38 has the secondary of the reference transformer 30 connected across terminals 40 and 42 and the secondary of the output transformer 28 connected across terminals 44 and 46. The output from phase detector 26 is taken respectively across center taps 48 and 50 of the output and reference transformer secondaries.

The operation of the phase detector 26 can be best understood by referring to the wave forms in FIGURE 2. As shown there, the reference signal voltage will have the indicated phase. Then for exemplary purposes, the error signal voltage across terminals 46 and 48 and terminals 44 and 48 may vary in phase relative to the reference signal voltage the amount indicated and have a phase angle difference equal to $\theta$. The output control voltage across the terminals 48 and 50 will appear as shown and have the average voltage level indicated. If as previously discussed the error signal voltage and the reference signal voltage are 90° out of phase, such that the synchronous rectifying action occurs at 90° after the zero point, a null output control voltage across the terminals 48 and 50 will occur and have the wave form indicated, the null being because the average D.C. level is zero. Consequently, the control voltage applied to the servo amplifier 32 will at all times have an average D.C. level corresponding to any phase variations in the error signal voltage relative to the reference signal voltage. These variations may be negative or positive.

Briefly summarizing the operation, the gap spacing between the cutting tool 10 and the workpiece 12 can be initially established at the desired distance; then the A.C. power supply 22 turned on. If the error signal voltage is other than 90° out of phase with the reference signal voltage from the reference generator 30, the meter 36 will indicate this. Accordingly, a suitable variable phase shifter 52 is connected to the output of the A.C. power supply 22 so as to permit the phase of the A.C. power to be adjusted until the null is attained. Now the process may be commenced and no corrections in gap spacing will take place until an impedance change occurs in the control circuit 20, which the output transformer 48 will see as a phase shift in the gap fluctuations. The resultant error signal will be synchronously rectified by the reference signal and a corresponding average D.C. output of whichever polarity is needed to either increase or decrease the gap spacing will be developed.

From the foregoing, it will be appreciated that the variable phase shifter 52 permits the A.C. power to be varied for different sizes of cutting tool and workpieces and different gap spacings. Also, the A.C. power supply 22 both provides a reference signal for the phase detector 26 and produces the gap fluctuations of the phase wanted for detecting subsequent changes. Thus, an accurate way of controlling gap spacing is provided, one that is reliable and one that is responsive so as to detect, e.g., short circuits early and make the proper corrections before damage can result. The gap spacing control system is relatively simple and utilizes a minimum of components without resort to complexity.

The invention is to be limited only by the following claims.

I claim:

1. In the process of electrically removing stock from a conductive workpiece by a conductive electrode, the steps including maneuvering the workpiece and the electrode relative to each other so as to form a predetermined gap therebetween, flowing electrolyte to the gap, applying electrical energy across the gap so as to effect stock removal from the workpiece, applying A.C. electrical energy to an LC series circuit incorporating a predetermined inductive reactance arranged in series with the gap, which constitutes the capacitive reactance, so that changes in the gap spacing from the predetermined gap cause corresponding changes in the LC circuit impedance, detecting the impedance changes, and altering the maneuvering of the workpiece and the electrode relative to each other in response to the electrical quantity so as to maintain the predetermined gap.

2. In the process of electrically removing stock from a conductive workpiece by a conductive electrode, the steps including maneuvering the workpiece and the electrode relative to each other so as to form a predetermined gap therebetween, flowing electrolyte to the gap, applying electrical energy across the gap so as to effect stock removal from the workpiece, connecting an inductive reactance in circuit with the gap, which constitutes the capacitive reactance, so that an LC series circuit is provided and changes in the gap spacing from the predetermined gap cause the phase of an output signal developed by the LC series circuit to be correspondingly varied, detecting variations in the phase of the output signal relative to a predetermined reference phase corresponding to the predetermined gap, and altering the maneuvering of the workpiece and the electrode relative to each other in response to the detected variations so as to maintain the predetermined gap.

3. In the process of electrically removing stock from a conductive workpiece by a conductive electrode, the steps including maneuvering the workpiece and the electrode relative to each other so as to form a predetermined gap therebetween, flowing electrolyte to the gap, applying electrical energy across the gap so as to effect stock removal from the workpiece, supplying A.C. electrical energy of a certain phase corresponding to the predetermined gap to an LC series circuit including the gap and a certain inductive reactance combined therewith so that the gap constitutes a capacitive reactance that varies with changes in the gap spcing from the predetermined gap and causes the phase of an output signal from the LC circuit to correspondingly vary, detecting changes in the phase of the output signal from the certain phase and developing a corresponding error signal, and altering the maneuvering of the workpiece and the electrode relative to each other in response to the error signal so as to maintain the predetermined gap.

4. In electrochemical machining apparatus, the combination of cutting tool and workpiece electrodes spaced apart so as to provide a predetermined machining gap therebetween, a D.C. source of electrical energy applied across the gap so as to effect stock removal from the workpiece electrode, and gap spacing control means including an LC series circuit connected across the gap so that the gap constitutes in the circuit a capacitive reactance determined by the gap spacing, the LC series circuit having a certain inductive reactance representing the predetermined gap, an A.C. source of energy for energizing the LC series circuit, and means detecting variations in the impedance of the LC series circuit due to changes in gap spacing and developing a corresponding control signal for use by the gap spacing control in maintaining the predetermined gap.

5. In electrochemical machining apparatus, the combination of cutting tool and workpiece electrodes spaced apart so as to provide a predetermined machining gap therebetween, a D.C. source of electrical energy applied across the gap so as to effect stock removal from the workpiece electrode, and gap spacing control means including an LC series circuit connected across the gap so that the gap constitutes in the circuit a capacitive reactance and having a certain inductive reactance therein, means supplying A.C. electrical power of a certain characteristic corresponding to a predetermined gap to the LC series circuit so that changes in gap spacing cause the characteristic to correspondingly vary, and a detector sensing the variations in the characteristic and developing a corresponding control signal for use by the gap spacing control in maintaining the predetermined gap.

6. In electrochemical machining apparatus, the combination of cutting and workpiece electrodes spaced apart so as to provide a predetermined machining gap therebetween, a D.C. source of electrical energy applied across the gap so as to effect stock removal from the workpiece electrode, and gap spacing control means including an LC series circuit connected across the gap so that the gap constitutes a certain inductive reactance and having a certain inductive reactance therein, a source of A.C. energy of a certain phase corresponding to a predetermined gap coupled to the circuit so that changes in gap spacing cause the circuit to develop a correspondingly phase shifted output, and synchronous rectifying means coupled both to the circuit and to the A.C. source and arranged to synchronously rectify the output in accordance with the A.C. energy from the source so as to develop a control signal corresponding to the phase difference for use by the gap spacing control in maintaining the predetermined gap.

7. In electrochemical machining apparatus; the combination of cutting tool and workpiece electrodes spaced apart so as to provide a predetermined machining gap therebetween; a D.C. source of electrical energy applied across the gap so as to effect stock removal from the workpiece electrode; gap spacing control means including a control circuit connected across the gap so that the gap constitutes in the control circuit a capacitive reactance determined by the gap spacing, a phase detector, a reference source of A.C. energy of a certain phase corresponding to the predetermined gap, an input transformer coupling the reference source to the circuit so as to produce voltage fluctuations across the gap, and an output transformer coupling the phase detector to the control circuit, the output transformer having the primary thereof constituting a certain inductive reactance in the control circuit and the secondary thereof connected to the phase detector so that the phase of the output thereto corresponds to the gap spacing, the phase detector being operative to compare the phase of the output with the certain phase and develop a control signal corresponding to the phase difference for use by the gap spacing control in maintaining the predetermined gap; and means varying the phase of the source.

References Cited

UNITED STATES PATENTS

| 2,276,644 | 3/1942 | Blankenbuehler | 314—69 |
| 2,886,693 | 5/1959 | Harris et al. | 219—69 |
| 2,927,191 | 3/1960 | Matulaitis | 219—69 |
| 3,058,895 | 10/1962 | Williams | 204—143 |
| 3,092,777 | 6/1963 | Rusche et al. | 328—133 |
| 3,109,120 | 10/1963 | Scarpelli | 219—69 |
| 3,128,364 | 4/1964 | Wanttaja et al. | 219—69 |
| 3,175,145 | 3/1965 | Brouwer | 318—478 |
| 3,223,603 | 12/1965 | Inoue | 219—69 |
| 3,228,863 | 1/1966 | Wanttaja et al. | 204—143 |

FOREIGN PATENTS

| 1,276,195 | 10/1961 | France. |
| 145,104 | 5/1962 | Russia. |

OTHER REFERENCES

Kloeffler, Industrial Electronics and Control, John Wiley & Sons Inc., New York, 1949, pp. 122, 124 and 225–227.

JOHN H. MACK, *Primary Examiner.*

HOWARD S. WILLIAMS, *Examiner.*

R. K. MIHALEK, *Assistant Examiner.*